United States Patent
Kim et al.

(10) Patent No.: US 7,020,055 B2
(45) Date of Patent: Mar. 28, 2006

(54) OPTICAL PICKUP APPARATUS

(75) Inventors: Jong-bae Kim, Seoul (KR);
Young-man Ahn, Gyeonggi-do (KR);
Tatsuhiro Otsuka, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 427 days.

(21) Appl. No.: 10/233,569

(22) Filed: Sep. 4, 2002

(65) Prior Publication Data

US 2003/0063533 A1   Apr. 3, 2003

(30) Foreign Application Priority Data

Sep. 4, 2001   (KR) .............................. 2001-54152

(51) Int. Cl.
*G11B 7/00* (2006.01)
(52) U.S. Cl. .............................. 369/44.41; 369/44.35; 369/112.01; 369/53.22
(58) Field of Classification Search ........... 369/112.01, 369/112.1, 53.2, 53.22, 53.28, 94, 44.41, 369/44.42, 44.35, 44.34, 53.1, 44.23, 44.24, 369/112.02
See application file for complete search history.

(56) References Cited

U.S. PATENT DOCUMENTS 5,963,524 A * 10/1999 Tokiwa et al. ............ 369/53.23
6,418,108 B1 * 7/2002 Ueda et al. ............ 369/112.23
6,584,065 B1 * 6/2003 Maeda et al. ............ 369/275.1
6,661,750 B1 * 12/2003 Saimi et al. ............. 369/44.23
6,788,628 B1 * 9/2004 Katayama ................ 369/44.37

FOREIGN PATENT DOCUMENTS

| CN | 1273414 | 11/2000 |
|---|---|---|
| JP | 8-306056 | 11/1996 |
| JP | 2000-155979 | 6/2000 |
| JP | 2000-182254 | 6/2000 |
| JP | 2001-23195 | 1/2001 |
| JP | 2001-209943 | 8/2001 |

* cited by examiner

*Primary Examiner*—Nabil Hindi
(74) *Attorney, Agent, or Firm*—Stein, McEwen & Bui, LLP

(57) ABSTRACT

An optical pickup apparatus includes a detection unit detecting a light beam reflected/diffracted by the recording medium and passing through the objective lens by dividing the light beam into a plurality of light areas, and a signal processor detecting a difference between widths T1 and T2 indicating that first and second focusing signals are greater than a predetermined threshold value and a thickness signal of the recording medium by using the detected difference when an S-curve of a focus error signal detected by using detection signals of the light areas output from the detection unit is obtained by subtracting a second detecting signal from a first detecting signal or by subtracting the first focusing signal from the second signal. Thus, a spherical aberration due to a change in thickness of the recording medium can be corrected by driving a spherical aberration correcting device according to a thickness signal corresponding to the change in thickness of the recording medium.

44 Claims, 12 Drawing Sheets

OPTICAL PICKUP APPARATUS

CROSS-REFERENCE TO RELATED APPLICATIONS

This application claims the benefit of Korean Patent Application No. 2001-54152, filed Sep. 4, 2001, in the Korean Industrial Property Office, the disclosure of which is incorporated herein by reference.

BACKGROUND OF THE INVENTION

1. Field of the Invention

The present invention relates to an optical pickup apparatus, and more particularly, to an optical pickup apparatus capable of quantitatively detecting a change in thickness of a recording medium.

2. Description of the Related Art

In general, an information recording/reproducing density increases as a size of a light spot formed on a recording medium by an optical pickup apparatus decreases. The size of the light spot decreases, as shown in Mathematical Formula 1, as a wavelength $\lambda$ of light in use becomes shorter, and an NA (numerical aperture) of an objective lens becomes greater.

$$\text{Size of light spot} \propto \lambda/NA. \quad \text{Mathematical Formula 1}$$

Thus, to decrease the size of the light spot formed on the recording medium in order to achieve a high density recording medium, a short wavelength light source, such as a blue semiconductor laser, and an objective lens having a high NA are necessarily adopted in the optical pickup apparatus. In a field to which the present technology pertains, a format enabling an increase of a recording capacity to 22.5 GB or more by using the objective lens having a 0.85 NA and a reduction of a thickness of the recording medium to 0.1 mm is noted to prevent deterioration of a performance due to inclination of a surface of the recording medium. Here, the thickness of the recording medium denotes a distance from a light input surface to a recording surface of the recording medium.

However, as shown in Mathematical Formula 2, a spherical aberration $W_{40d}$ is proportional to both the NA of the objective lens to the fourth power and an error in thickness of the recording medium. Accordingly, to adopt the objective lens having a high NA of about 0.85, the recording medium must have a uniform thickness within a range of ±3 μm. Nevertheless, it is very difficult to manufacture the recording medium having the thickness of 0.1 mm and within the scope of the above error in thickness.

$$W_{40d} = \frac{n^2-1}{8n^3}(NA)^4 \Delta d. \quad \text{Mathematical Formula 2}$$

Here, n is a refractive index of an optical medium of the recording medium.

FIG. 1 is a graph showing a relationship between the error in thickness of the recording medium and an OPD (optical path difference) generated due to the error when the light source emitting a light beam having a wavelength of 400 nm and the objective lens having a 0.85 NA are employed. As shown in FIG. 1, the OPD increases in proportion to the error in thickness. Since the OPD generated by the error in thickness of the recording medium corresponds to the spherical aberration, the error in thickness of the recording medium is reflected to the optical pickup apparatus in a form of the spherical aberration.

Thus, it is necessary to detect the spherical aberration generated due to the error in thickness of the recording medium and correct the detected spherical aberration in a system using the high NA such as 0.85 NA.

FIG. 2 shows an optical arrangement of a conventional optical pickup apparatus disclosed in Japanese Patent Publication No. 2000-155979 which is capable of detecting and correcting the spherical aberration. Referring to FIG. 2, the conventional optical pickup apparatus includes a light source 10, an objective lens 17 focusing a light beam emitted from the light source 10 on a recording medium 1, a half mirror 11 changing a proceeding path of the light beam reflected by the recording medium 1 and passing through the objective lens 17, a hologram 20 splitting the light beam, of which a proceeding path is changed by the half mirror 11 into a first light beam passing through a particular area and a second light beam passing through another area, and deflecting the split light beams, first through fourth photodetectors 21 detecting the first light beam passing through the particular area and deflected by the hologram 20, a signal processing circuit 23 detecting an aberration from detection signals from the first through fourth photodetectors 21, and a wavefront changing device 25 changing a wavefront of the light beam proceeding toward the recording medium 1 from the light source 10 according to a correction signal input from the signal processing circuit 23. Here, reference numeral 13 denotes a collimating lens changing a divergent light beam emitted from the light source 10 to a parallel beam.

FIG. 3 shows the OPD when the spherical aberration is generated. When the spherical aberration is generated, wavefronts 27a and 27b delayed symmetrically to an optical axis c are generated with respect to a reference wavefront 27 at a center of an aperture. In contrast, the spherical aberration is generated in a case in which the wavefront is preceded symmetrical to the optical axis c.

Thus, the hologram 20, as shown in FIG. 4, has first and second diffraction areas 20a and 20b for selecting the light beam in a delayed wavefornt area, dividing the selected light beam into halves with respect to an axis x crossing the optical axis, and diffracting the half light beams in directions symmetrical to each other to proceed toward first and fourth photodetectors 21a and 21b. Also, the hologram 20 includes a third diffraction area 20c diffracting the light beam in an upper area above the axis x of the light beam except for the delayed wavefront area and making the diffracted light beam proceed toward a second photodetector 21b, and a transmission area 20d transmitting the light beam in a lower area below the axis x, as is, to proceed toward a third photodetector 21c. The first and second diffraction areas 20a and 20b are half-ring shaped.

Each of the first and fourth photodetectors 21a and 21d has a two-section structure so that generation of the spherical aberration can be noted when a focus state of the light beam is detected. Also, each of the second and third photodetectors 21b and 21c has a structure divided into two so that a focus error signal can be detected in a knife edge method.

FIGS. 5A through 5C are views showing a change in patterns of the light beams received by the first through fourth photodetectors 21 according to the generation of the OPD. FIG. 5A shows the patterns of light beams received by the first through fourth photodetectors 21 when a delayed wavefront of the light beam is generated. The light beam of the delayed wavefront area, which is diffracted in the first and second diffraction areas 20a and 20b, respectively, is focused behind the first and fourth photodetectors 21a and 21d. Since the patterns of the light beams received by the first and fourth photodetectors 21a and 21d are symmetrical, signals detected in a first section A of the first photodetector 21a and a second section D of the fourth photodetector 21d are greater than that detected in a second section B of the first photodetector 21a and a first section C of the fourth photodetector 21d, respectively.

Referring to FIG. 5B, in which the aberration is not generated, signals having the same amplitude are detected in the first and second sections A and B of the first photodetector 21a and also signals having the same amplitude are detected in the first and second sections C and D of the fourth photodetector 21d.

FIG. 5C shows the patterns of the light beams received by the first through fourth photodetectors 21 when a preceding wavefront of the light beam is generated. The light beam in a preceding wavefront area which is diffracted in the first and second diffraction areas 20a and 20b is focused in front of each of the first and fourth photodetectors 21a and 21d. The signal detected in the second section B of the first photodetector 21a and the first section C of the fourth photodetector 21d is greater than that detected in the first section A of the first photodetector 21a and the second section D of the fourth photodetector 21d, respectively.

Thus, a spherical aberration signal SES' is detected by subtracting a first sum signal of a detection signal b of the second section B of the first photodetector 21a and a detection signal c of the first section C of the fourth photodetector 21d from a second sum signal of a detection signal a of the first section A of the first photodetector 21a and a detection signal d of the second section D of the fourth photodetector 21d, as shown in Mathematical Formula 3.

$$SES'=(a+d)-(b+c).$$  Mathematical Formula 3

By using the conventional aberration detection method, an amount and sign of the aberration with respect to the spherical aberration can be detected.

However, since the conventional aberration detection method does not quantitatively detect a change in thickness of the recording medium, it is difficult to appropriately correct the spherical aberration corresponding to the change in thickness of the recording medium.

SUMMARY OF THE INVENTION

To solve the above and other problems, it is an object of the present invention to provide an optical pickup apparatus capable of quantitatively detecting a change in thickness of a recording medium.

Additional objects and advantageous of the invention will be set forth in part in the description which follows and, in part, will be obvious from the description, or may be learned by practice of the invention.

To achieve the above and other objects, there is provided an optical pickup apparatus comprising a light source generating and emitting an incident light beam, an objective lens condensing the light beam emitted from the light source to form a light spot on a recording medium, an optical path changing device changing a proceeding path of the light beam, a detection unit detecting the light beam reflected/diffracted by the recording medium and passing through the objective lens by dividing the light beam into a plurality of light areas, and a signal processor obtaining an focus error signal by using light area detection signals output from the light areas of the detection unit and detecting a thickness signal of the recording medium using the obtained focus error signal.

According to an aspect of the present invention, when a maximum point and an absolute value of a minimum point of an S-curve of the focus error signal with respect to a predetermined reference level are a and b, the signal processor obtains a calculation value of (a−b)/(a+b) and outputs the thickness signal of the recording medium corresponding to the obtained calculation value.

According to another aspect of the present invention, the detection unit detects the incident light beam after passing through the objective lens by dividing the light beam into four light areas having four inner light areas and four outer light areas, forming a 4×2 matrix structure when a row and a column correspond to a radial direction and a tangential direction of the recording medium, respectively. The four inner light areas are first through fourth inner light areas in a rotation direction, and the four outer light areas are first through fourth outer light areas in the rotation direction. The first through fourth outer light areas are disposed outside the first through fourth inner light areas. The signal processor detects a first signal, which is a first sum of detection signals of the first and third outer light areas and the second and fourth inner light areas, and a second signal, which is a second sum of detection signals of the second and fourth outer light areas and the first and third inner light areas, and detects the focus error signal by subtracting the second signal from the first signal or by subtracting the first signal from the second signal.

According to still another aspect of the present invention, the detection unit comprises a holographic optical element dividing the incident light beam after passing through the objective lens into the first through fourth light areas in the rotation direction and diffracting the light beams of the first through fourth light areas to $+1^{st}$ order and/or $-1^{st}$ order, and a photodetector having first through fourth light receiving areas receiving the light beams by dividing each of the first through fourth light areas of the $+1^{st}$ order or $-1^{st}$ order diffracted by the holographic optical element into the inner light areas and outer light areas in a direction corresponding to a tangential direction of the recording medium.

According to yet another aspect of the present invention, the detection unit and the signal processor detect the focus error signal by using an astigmatism method.

According to still yet another aspect of the present invention, the detection unit is the photodetector having an eight-section structure detecting the incident light beam after passing the objective lens by dividing the incident light beam into the first through fourth light areas in the rotation direction and each of the first through fourth inner and outer light areas in a direction corresponding to the radial direction of the recording medium.

To achieve the above and other objects, there is provided an optical pickup apparatus comprising a light source generating and emitting an incident light beam, an objective lens condensing the light beam emitted from the light source to form a light spot on a recording medium, an optical path changing device changing a proceeding path of the light beam, and a detection unit detecting the light beam reflected/diffracted by the recording medium and passing through the objective lens by dividing the light beam into a plurality of light areas. When the S-curve of the focus error signal detected by using detection signals of the light areas output from the detection unit is obtained by subtracting the second signal from the first signal or by subtracting the first signal from the second signal, a difference between widths T1 and T2 indicating that the first and second signals are greater than a predetermined threshold value, is detected, and the thickness signal of the recording medium is detected by using the detected difference.

According to another aspect of the present invention, the detection unit detects the incident light beam after passing through the objective lens by dividing the light beam into the four inner light areas and the four outer light areas, forming a 4×2 matrix structure when a row and a column correspond to the radial direction and the tangential direction of the recording medium, respectively. The four inner light areas are the first through fourth inner light areas in the rotation direction, and the four outer light areas are the first through fourth outer light areas in the rotation direction. The first through fourth outer light areas are disposed outside the first through fourth inner light areas. The first signal is the first sum of detection signals of the first and third outer light areas and the second and fourth inner light areas, and the second signal is the second sum of detection signals of the second and fourth outer light areas and the first and third inner light areas.

According to another aspect of the present invention, the detection unit comprises the holographic optical element dividing the incident light beam after passing through the objective lens into the first through fourth light areas in the rotation direction and diffracting the light beams of the first through fourth light areas to $+1^{st}$ order and/or $-1^{st}$ order, and the photodetector having the first through fourth light receiving areas receiving the light beams by dividing each of the first through fourth light areas of the $+1^{st}$ order or $-1^{st}$ order diffracted by the holographic optical element into the inner light areas and the outer light areas in the direction corresponding to the tangential direction of the recording medium.

According to another aspect of the present invention, the detection unit detects the incident light beam after passing through the objective lens by dividing the light beam into the first through fourth light areas in the rotation direction. The first signal is the first sum of detection signals of the first and third light areas, and the second signal is the second sum of detection signals of the second and fourth light areas.

According to another aspect of the present invention, the detection unit is the photodetector having an eight-section structure to detect the light beams by dividing each of the first through fourth light areas into the inner and outer light areas in the direction corresponding to the radial direction of the recording medium.

BRIEF DESCRIPTION OF THE DRAWINGS

The above object and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Figure 1:
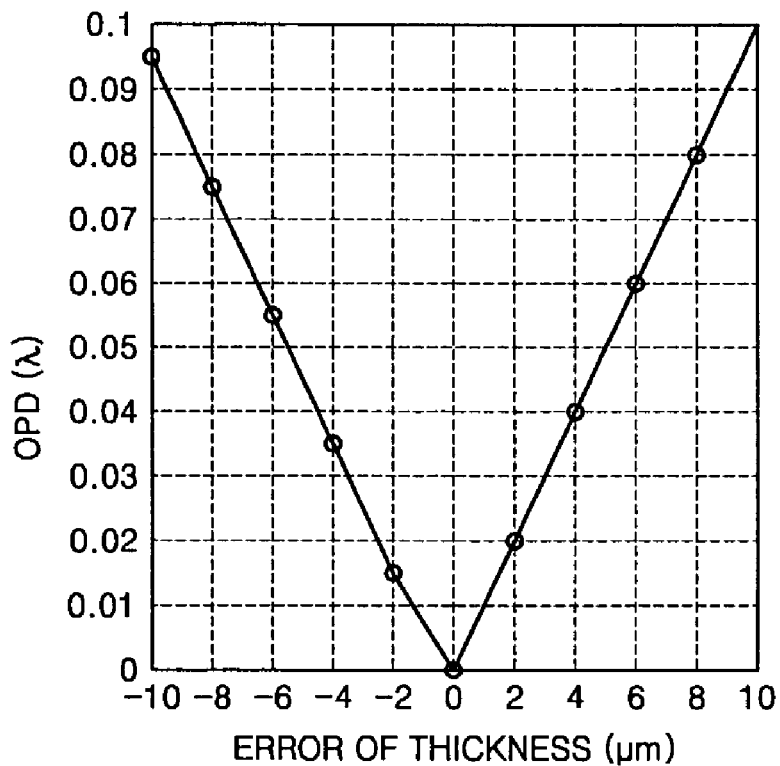
FIG. 1 is a graph showing a relationship between an error in thickness of a substrate of a recording medium and an OPD generated due to the error.
Figure 2:
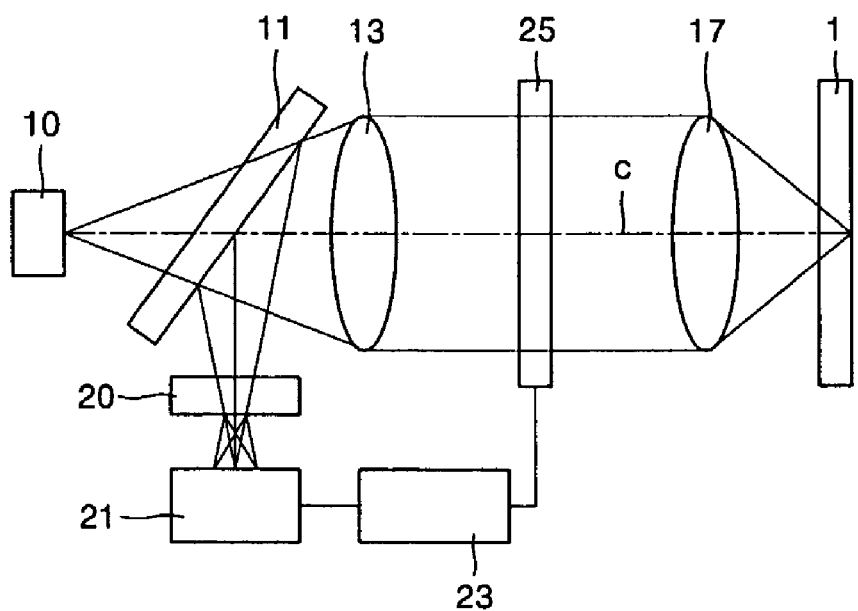
FIG. 2 is a view showing an example of an optical arrangement of a conventional optical pickup apparatus capable of detecting and correcting an aberration.
Figure 3:
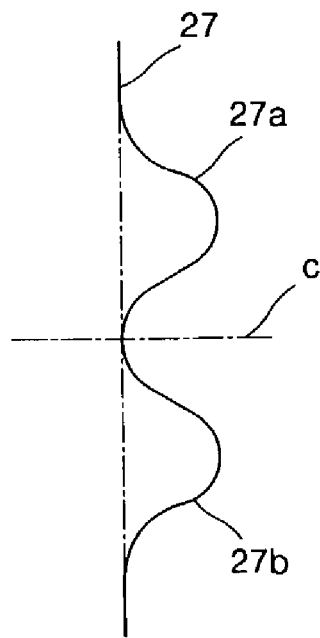
FIG. 3 is a graph showing the OPD when a spherical aberration is generated.
Figure 4:
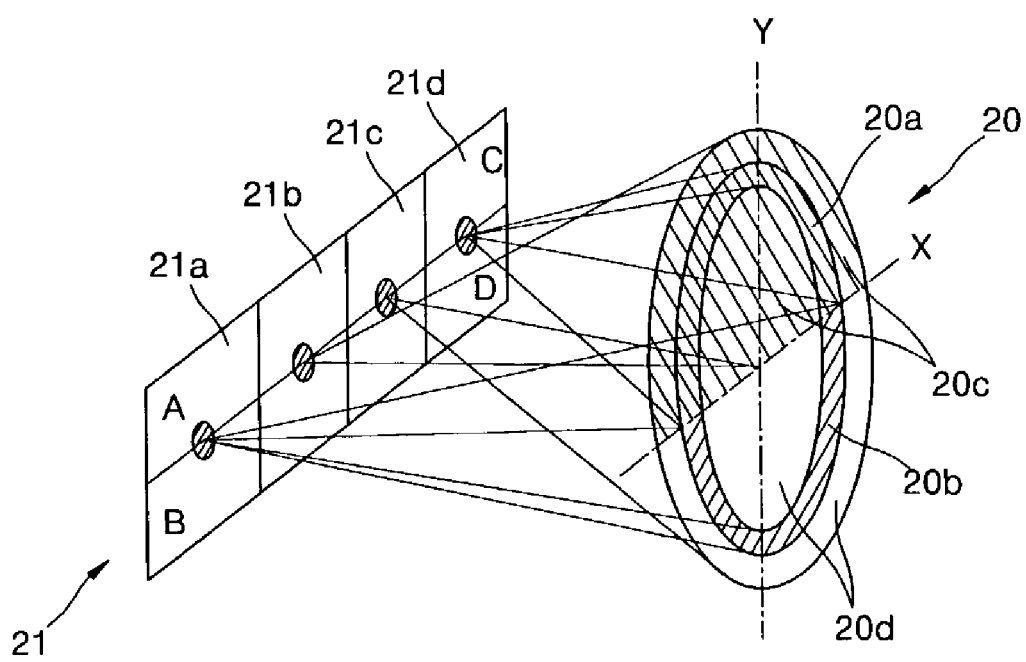
FIG. 4 is a view showing a structure of a hologram and an arrangement of photodetectors of FIG. 2.
Figure 5A:
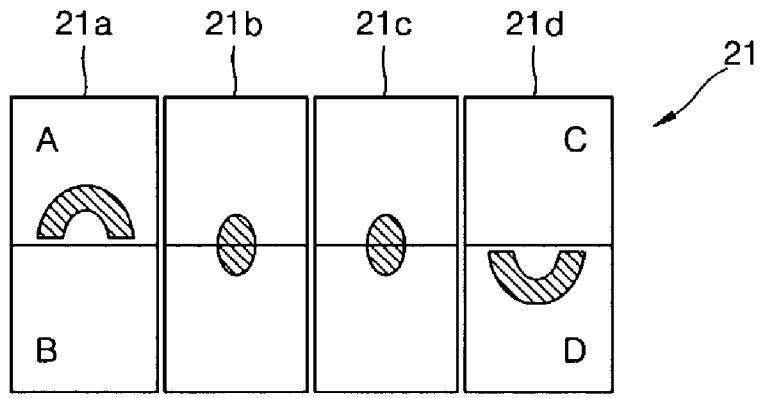
FIGS. 5A through 5C are views showing changes of patterns of light beams received by the photodetectors of FIGS. 2 and 4.
Figure 5B:
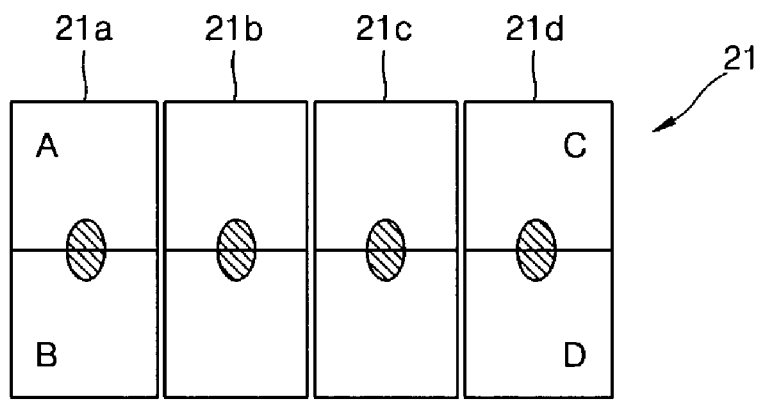
Figure 5C:
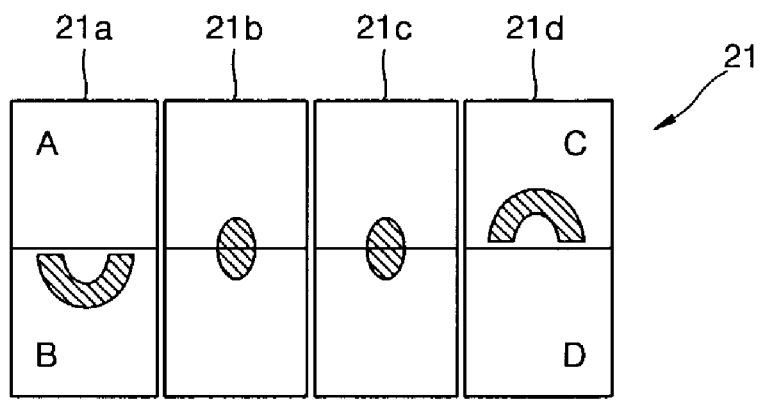

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figure 6:
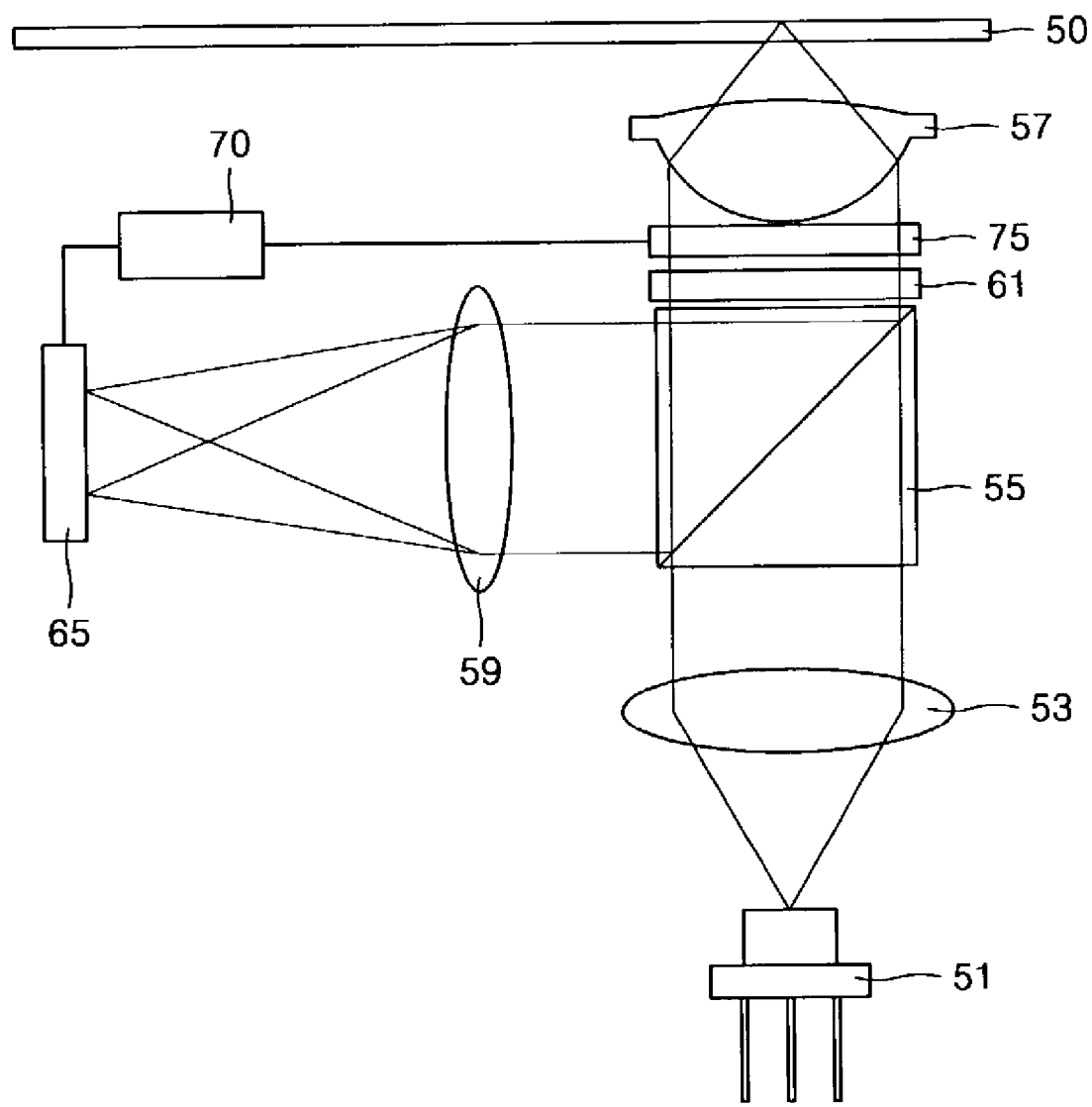
FIG. 6 is a view showing an optical arrangement of an optical pickup apparatus according to an embodiment of the present invention.

Referring to FIG. 6, an optical pickup apparatus according to an embodiment of the present invention includes a light source 51 generating and emitting a light beam, an objective lens 57 forming a light spot on a recording medium 50 by focusing the light beam emitted from the light source 51, an optical path changing device changing a proceeding path of the light beam, a detection unit dividing a light beam reflected by the recording medium 50 and passing through the objective lens 57 in a plurality of light areas and detecting the light areas of the light beam, and a signal processor 70 detecting a signal corresponding to a thickness of the recording medium 50 by using detection signals output from the detection unit.

A semiconductor laser, such as an edge emitting laser or vertical cavity surface emitting laser, is preferably used as the light source 51.

A beam splitter 55 transmitting and reflecting an incident light beam at a predetermined ratio may be employed as the optical path changing device. Alternatively, the optical path changing device can be formed of a polarizing beam splitter selectively transmitting and reflecting an incident light beam according to a polarization of the light beam and a ¼ wave plate changing the polarization of the incident light beam.

When the optical pickup apparatus is used for recording/reproducing data on/from the recording medium of a next generation DVD having a recording capacity of 20 GB or more, a semiconductor laser emitting a light beam having a wavelength of a blue-violet wavelength area, for example, 400 nm, is preferably provided as the light source 51. Also, a condensing lens having a numerical aperture (NA) of 0.7 or more, for example, 0.85, is preferably used as the objective lens 57.

Here, the objective lens 57 adopted in the optical pickup apparatus is designed with respect to the recording medium 50 having a predetermined thickness (a reference thickness). The thickness of the recording medium represents a distance from a light input surface of an outer layer to a recording surface of a recording layer storing the data. Thus, when the recording medium 50 inserted in a recording/reproducing apparatus adopting the optical pickup apparatus has a thickness different from the reference thickness used in designing the objective lens 57 or a deviation in thickness according to a position on the recording medium 50, the optical pickup apparatus quantitatively detects a change in thickness of the recording medium 50 and additionally corrects a spherical aberration according to the change in thickness of the recording medium 50.

Preferably, the optical pickup apparatus further includes a collimating lens 53 arranged on an optical path between the light source 51 and the optical path changing device to change a divergent light beam emitted from the light source 51 to a parallel beam, and a sensing lens 59 arranged on the optical path between the optical path changing device and a photodetector 65 of a detection unit described later to condense an incident light beam so that the photodetector 65 receives the condensed light beam.

The detection unit is formed to divide the light beam into first through fourth light areas having first through fourth inner light areas and first through fourth outer light areas to form a matrix structure of 4×2 so that the light beam input after passing through the objective lens 57 can be detected in the respective light areas, assuming that a row and a column of the light areas corresponds to a radial direction (R) and a tangential direction (T) of the recording medium 50, respectively. Here, the first through fourth inner and outer light areas are assumed to be arranged in a rotation direction of the matrix structure. The rotation direction means an order of a clockwise or counterclockwise direction in the matrix structure.

The detection unit which detects the light beam input after passing through the objective lens 57 by dividing the light beam into eight may include, for example, a holographic optical element 61 and the photodetector 65. When the holographic optical element 61 is arranged on the optical path between the optical path changing device and the objective lens 57 as shown in FIG. 6, the holographic optical element 61 preferably transmits an incident light beam output from the light source 51 to proceed straight with a diffraction and diffracts the incident light beam reflected by the recording medium 50. Of course, the holographic optical element 61 may be arranged on the optical path between the optical path changing device and the photodetector 65. In this case, directions of the diffraction and transmission of the light beam in the holographic optical element 61 are not particularly limited.

Figure 7:
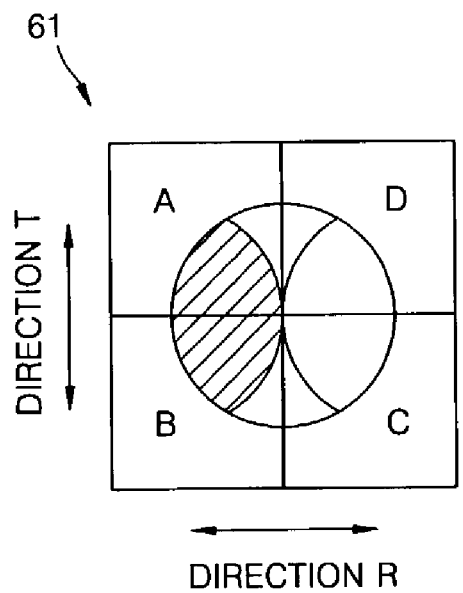
FIG. 7 is a view schematically showing an example of a holographic optical element of FIG. 6.

The holographic optical element 61, as shown in FIG. 7, preferably includes first through fourth diffraction areas A, B, C, and D which divide the light beam input after passing through the objective lens 57 into the first through fourth light areas arranged in the rotation direction and diffract the light beams of the first through fourth light areas into a $+1^{st}$ order and a $-1^{st}$ order. Also, the first and third diffraction areas A and C of the holographic optical element 61 are preferably formed to be able to focus, for example, the light beams of the first and third light areas of the $+1^{st}$ order on a first position located behind the photodetector 65. The second and fourth diffraction areas B and D are preferably formed to be able to focus, for example, the light beams of the second and fourth light areas of the $+1^{st}$ order on a second position located in front of the photodetector 65. Here, the first through fourth diffraction areas A, B, C and D of the holographic optical element 61 can be formed to be able to focus the light beams of the first through fourth light areas of the $-1^{st}$ order at opposite positions to the light beams of the first through fourth light areas of the $+1^{st}$ order.

Here, the first through fourth light areas and the first through fourth diffraction areas A, B, C, and D corresponding thereto form a 2×2 matrix structure.

Figure 8:
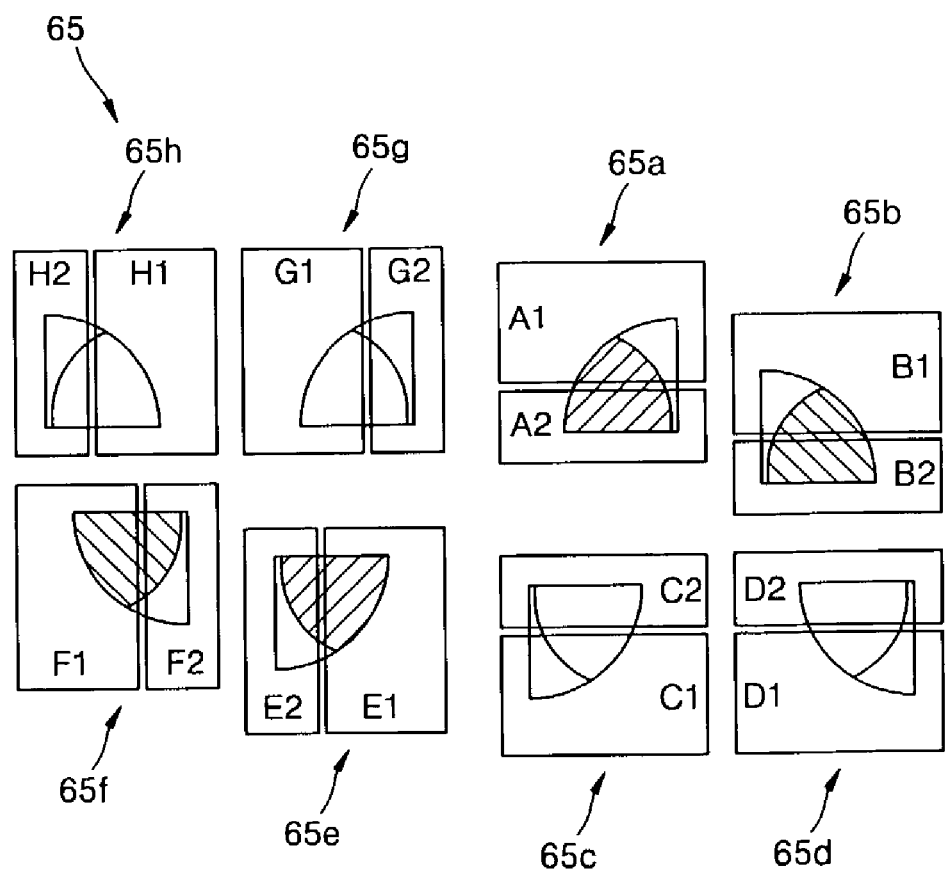
FIG. 8 is a view schematically showing an example of photodetectors of FIG. 6.

The photodetector 65 as shown in FIG. 8, includes first through fourth light receiving areas 65a, 65b, 65c, and 65d which receive the light beam diffracted by the first through fourth diffraction areas A, B, C, and D of the holographic optical element 61 by dividing each of the first through fourth light areas of the $+1^{st}$ order into an inner light area and an outer light area. The light beams of the inner light areas of the first through fourth light areas of the $+1^{st}$ order are respectively received in first through fourth inner light receiving areas A2, B2, C2, and D2 of the first through fourth light receiving areas 65a, 65b, 65c, and 65d. Also, the light beams of the outer light areas of the first through fourth light areas of the $+1^{st}$ order are respectively received in first through fourth outer light receiving areas A1, B1, C1, and D1 of the first through fourth light receiving areas 65a, 65b, 65c, and 65d.

When the light beams of the second and fourth light areas of the $+1^{st}$ order are focused in front of the photodetector 65, the light beams of the second and fourth light areas of the $+1^{st}$ order received by the second and fourth light receiving areas 65b and 65d of the photodetector 65 form reversed images as shown in FIG. 8.

The photodetector 65 as shown in FIG. 8, further includes fifth through eighth light receiving areas 65e, 65f, 65g, and 65h receiving the light beams of the first through fourth light areas of the $-1^{st}$ order. The fifth through eighth light receiving areas 65e, 65f, 65g, and 65h are preferably formed to receive the light beams by dividing each of the first through fourth light areas of the $-1^{st}$ order into the inner and outer light areas in the direction R, so that a reproduction signal (RF signal), in which a cross talk occurring due to neighboring tracks is reduced can be detected.

That is, when fifth through eighth inner light receiving areas of the fifth through eighth light receiving areas 65e, 65f, 65g, and 65h receiving the light beams of the inner light areas of the first through fourth light areas of the $-1^{st}$ order, and detection signals thereof, are E2, F2, G2, and H2, and when fifth through eighth outer light receiving areas of the fifth through eighth light receiving areas 65e, 65f, 65g, and 65h receiving the light beams of the outer light areas of the first through fourth light areas of the $-1^{st}$ order, and detection signals thereof, are E1, F1, G1, and H1, the optical pickup apparatus preferably detects the RF signal as shown in Mathematical Formula 4. The RF signal detected from Mathematical Formula 4 has the reduced cross talk due to the neighboring tracks.

RF signal=(E2+F2+G2+H2)+
k(E1+F1+G1+H1).                      Mathematical Formula 4

Here, k is a predetermined gain which is applied so that the cross talk occurring due to the neighboring tracks can be optimized, that is, can be minimized. The holographic optical element 61 may be formed to diffract the light beams of the first through fourth light areas to the $+1^{st}$ order or the $-1^{st}$ order, to the $0^{th}$ order and the $\pm 1^{st}$ order, or to the $0^{th}$ order and the $+1^{st}$ order or $-1^{st}$ order. A structure of the photodetector 65 may be changed corresponding thereto.

The detection unit may include a photodetector having an eight-section structure to detect the light beam input after passing the objective lens 57 by dividing the light beam into the four inner light areas and the four outer light areas to form the 4×2 matrix structure instead of a structure formed by the holographic optical element 61 and the photodetector 65 as shown in FIGS. 7 and 8. Also, the detection unit may include a photodetector having a sixteen-section structure to obtain a result of Mathematical Formula 4 from detection signals of the detection unit, considering a detection of the RF signal having the reduced cross talk due to the neighboring tracks. As described above, The detection unit according to the preferred embodiment of the present invention can be variously modified within a scope of a concept of technology of the present invention.

Figure 9:
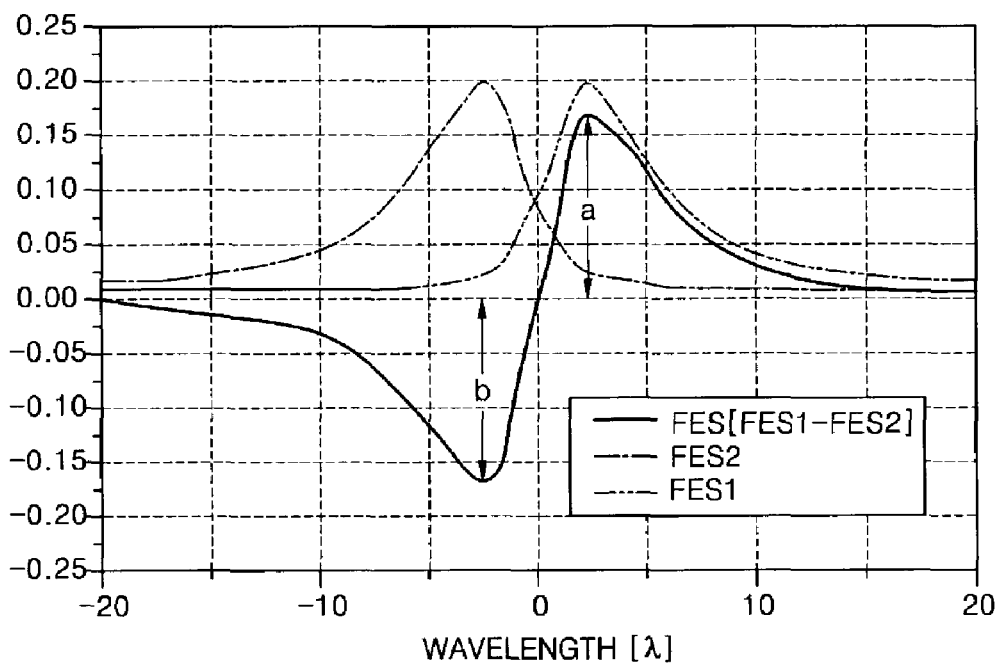
FIG. 9 is a graph showing definitions of a maximum value a and an absolute value b of a minimum value of an S-curve of a focus error signal (FES)

The signal processor 70 obtains a focus error signal (FES) by using the detection signals output from the detection unit and detects a thickness signal of the recording medium 50 by using the obtained focus error signal. As shown in FIG. 9, when a maximum value and an absolute value of a minimum value of an S-curve of the FES with respect to a reference level are a and b, respectively, the signal processor 70 preferably obtains a calculation value of (a−b)/(a+b) and outputs the thickness signal of the recording medium 50 corresponding thereto.

When the detection unit has the structure as described with reference to FIGS. 7 and 8, the signal processor 70 preferably detects a first signal (FES1), which is a first sum of the detection signals of the first and third outer light areas and the second and fourth inner light areas and a second signal (FES2), which is a second sum of the detection signals of the second and fourth outer light areas and the first and third inner light areas, and detects the focus error signal (FES) by subtracting the second signal (FES2) from the first signal (FES1).

When the first through fourth inner light receiving areas A2, B2, C2, and D2 of the first through fourth light receiving areas 65a, 65b, 65c, and 65d receiving the light beams of the first through fourth inner light areas, and the detection signals thereof, are indicated by the same sign, such as A2, B2, C2, and D2, respectively, and when the first through fourth outer light receiving areas A1, B1, C1, and D1 of the first through fourth light receiving areas 65a, 65b, 65c, and 65d receiving the light beams of the first through fourth outer light areas, and the detection signals thereof, are indicated by the same sign, such as A1, B1, C1, and D1, respectively, the FES1 and FES2 and the FES are shown in Mathematical Formula 5.

FES1=A1+B2+C1+D2,

FES2=A2+B1+C2+D1, and

FES=FES1−FES2.                      Mathematical Formula 5

Figure 10:
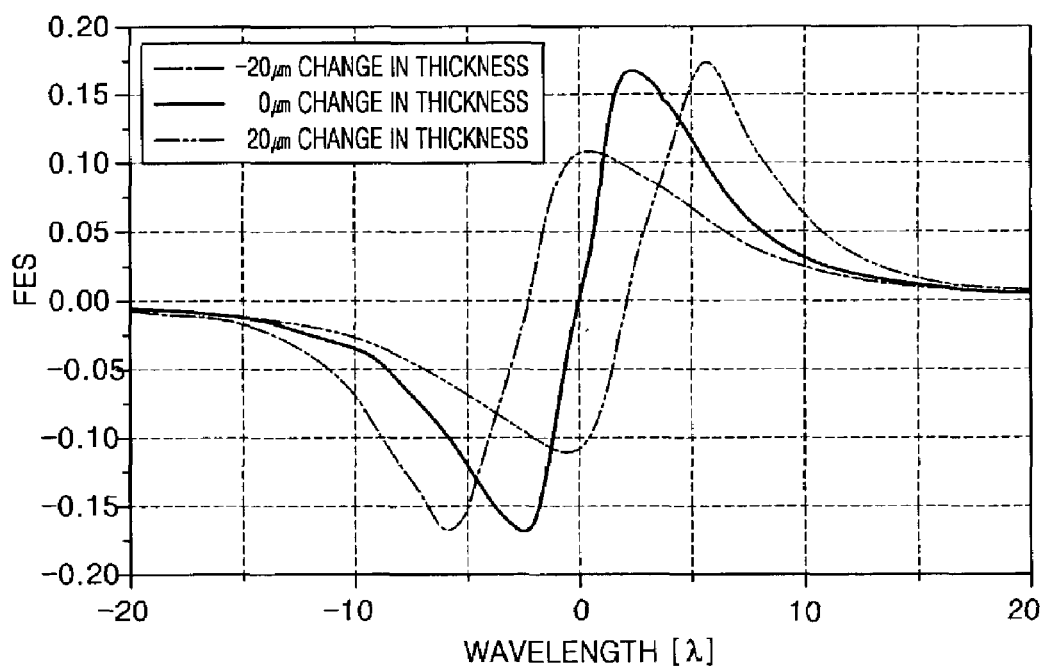
FIG. 10 is a graph showing a change of the S-curve of the FES obtained from Mathematical Formula 5 according to a change in thickness of a recording medium.

FIG. 10 shows the S-curve of the FES obtained by Mathematical Formula 5. The S-curve of the FES as can be seen from FIG. 10, moves to the left and right according to a change in thickness of the recording medium 50. Further, a ratio of a magnitude between a maximum point and a minimum point with respect to a reference level (an axis of which value is 0 along a vertical axis in FIG. 9) is changed according to the change in thickness of the recording medium 50.

Figure 11:
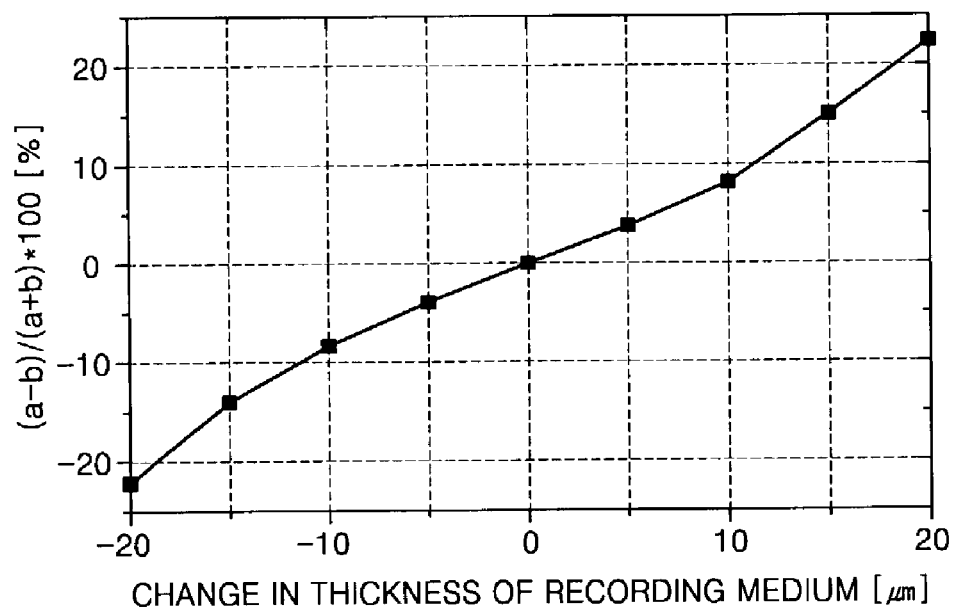
FIG. 11 is a graph showing a percentage of (a−b)/(a+b) calculated with respect to the S-curve of the FES obtained from Mathematical Formula 5 with respect to a change in thickness of a recording medium by using the maximum value a and the absolute value b of the minimum value defined as in FIG. 9.

FIG. 11 is a graph showing a percentage value of (a−b)/(a+b) calculated using the maximum value a and the absolute value b of the minimum value with respect to the change in thickness of the recording medium 50. As shown in FIG. 11, when the thickness of the recording medium 50 changes within a scope of −20~20 μm with respect to a predetermined reference thickness, a calculation value of (a−b)/(a+b)×100 obtained using the maximum value and the absolute value of the minimum value of the S-curve of the FES changes almost linearly.

Thus, the change in thickness of the recording medium 50 can be quantitatively detected by using the linearity. Whenever the recording medium 50 is newly inserted in the recording/reproducing apparatus, the thickness of the newly inserted recording medium 50 can be detected. That is, as descried above, since the percentage value of (a−b)/(a+b) calculated using the maximum value a and the absolute value b of the minimum value of the S-curve of the FES corresponds to the change in thickness of the recording medium 50 with respect to the reference thickness, a deviation of the thickness of the recording medium 50 (the change in thickness according to a position on a recording medium) and/or the thickness of the recording medium 50 which is newly inserted in the recording/reproducing apparatus can be detected.

Figure 12:
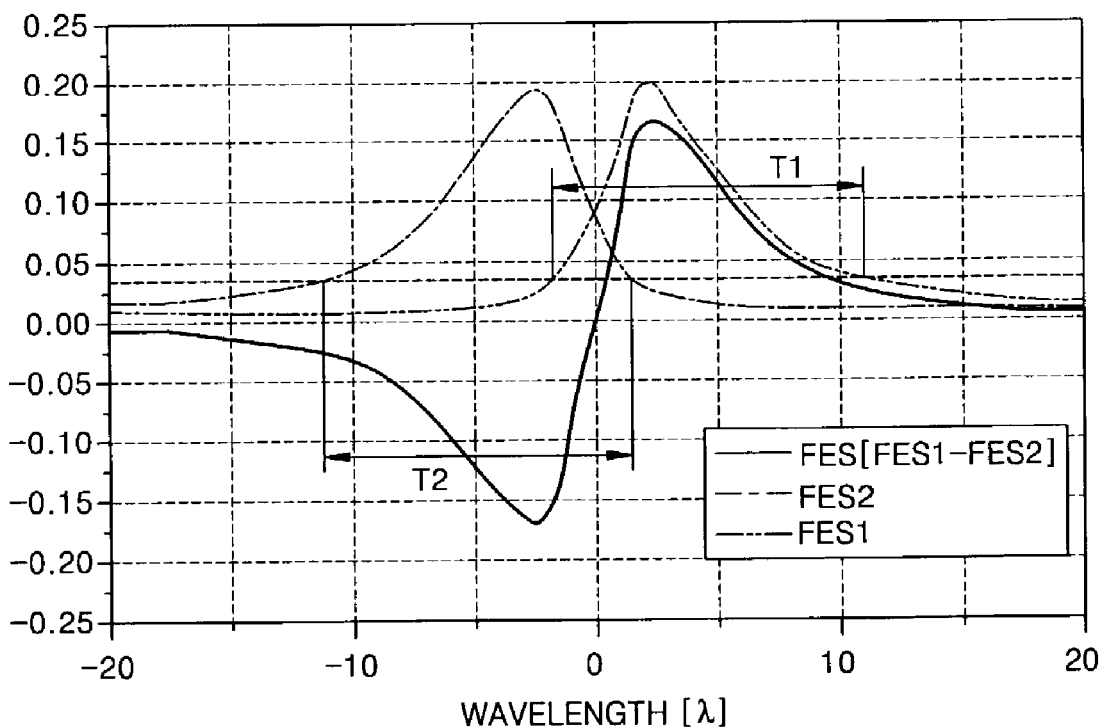
FIG. 12 is a graph showing widths T1 and T2 indicating that first and second signals FES1 and FES2 obtained from Mathematical Formula 5 are greater than a predetermined threshold.

Alternatively, when widths (time periods) indicating the FES1 and FES2 are greater than a predetermined threshold value or are maintained being greater than the predetermined threshold value, are T1 and T2, respectively, the signal processor 70 detects a difference between T1 and T2 (T1−T2) and detects the thickness signal of the recording medium 50 by using the detected difference between T1 and T2 as shown in FIG. 12. Here, the result of subtraction of the FES1 and FES2 is the S-curve of the FES. The FES1 is the first sum of the detection signals of the light beams of the first and third outer light areas and the second and fourth inner light areas. The FES2 is the second sum of the detection signals of the light beams of the second and fourth outer light areas and the first and third inner light areas.

Figure 13:
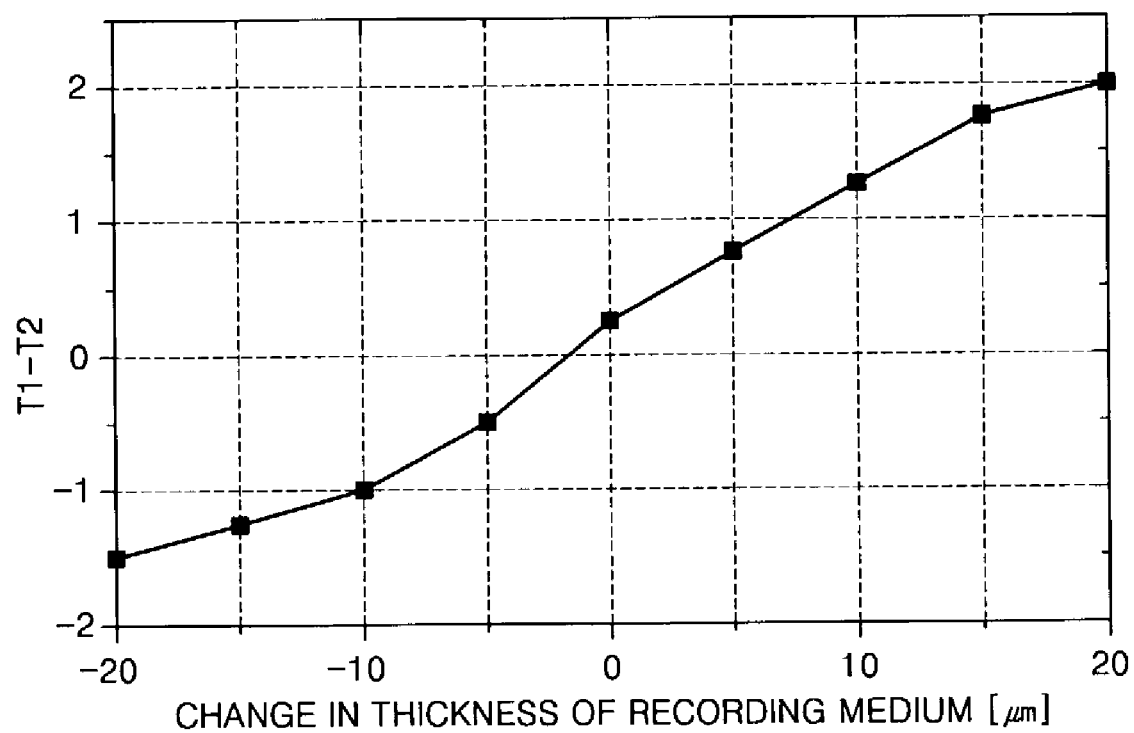
FIG. 13 is a graph showing a difference value (T1−T2) of T1 and T2 defined in FIG. 12 with respect to a change in thickness of a recording medium.

FIG. 13 is a graph showing a change of a value of (T1−T2) with respect to the change in thickness of the recording medium 50. As can be seen from the drawing, when the threshold value is appropriately selected, the value of (T1−T2) changes almost linearly with respect to the change in thickness of the recording medium 50. The threshold value is determined, through several, times trial error calculations, such that the value of (T1−T2) satisfying the linearity with respect to a change in thickness of the recording medium 50 can be obtained. In FIG. 13, T1 and T2 with respect to the threshold value of 0.036 (an arbitrary unit) are shown.

Thus, since the change in thickness of the recording medium 50 can be quantitatively detected as in a case of using the calculation value of (a−b)/(a+b) by using the linearity, the deviation of the thickness of the recording medium 50 and/or the thickness of the recording medium 50 newly inserted in the recording/reproducing apparatus can be detected.

Preferably, the optical pickup apparatus further includes a spherical aberration correcting device 75 driven by the thickness signal of the recording medium 50 output from the signal processor 70 to correct the spherical aberration occurring due to a difference in thickness of the recording medium 50 with respect to a reference thickness and the deviation in thickness of the recording medium 50. A liquid crystal plate formed by sealing two transparent substrates having an electrode pattern and a liquid crystal inserted therebetween may be used as the spherical aberration correcting device 75. A phase of the light beam passing through the liquid crystal plate is changed due to a feature that a refractive index of the liquid crystal is anisotropic. Thus, the spherical aberration according to the change in thickness of the recording medium 50 can be corrected by changing a wavefront of an incident light beam by driving the liquid crystal plate according to the deteced thickness signal of the recording medium 50 so that the light beam passing through the liquid crystal plate has the wavefront opposite to the spherical aberration generated according to the change in thickness of the recording medium 50. Here, a driving circuit driving the spherical aberration correcting device 75 can be included in the signal processor 70 or separately provided.

Figure 14:
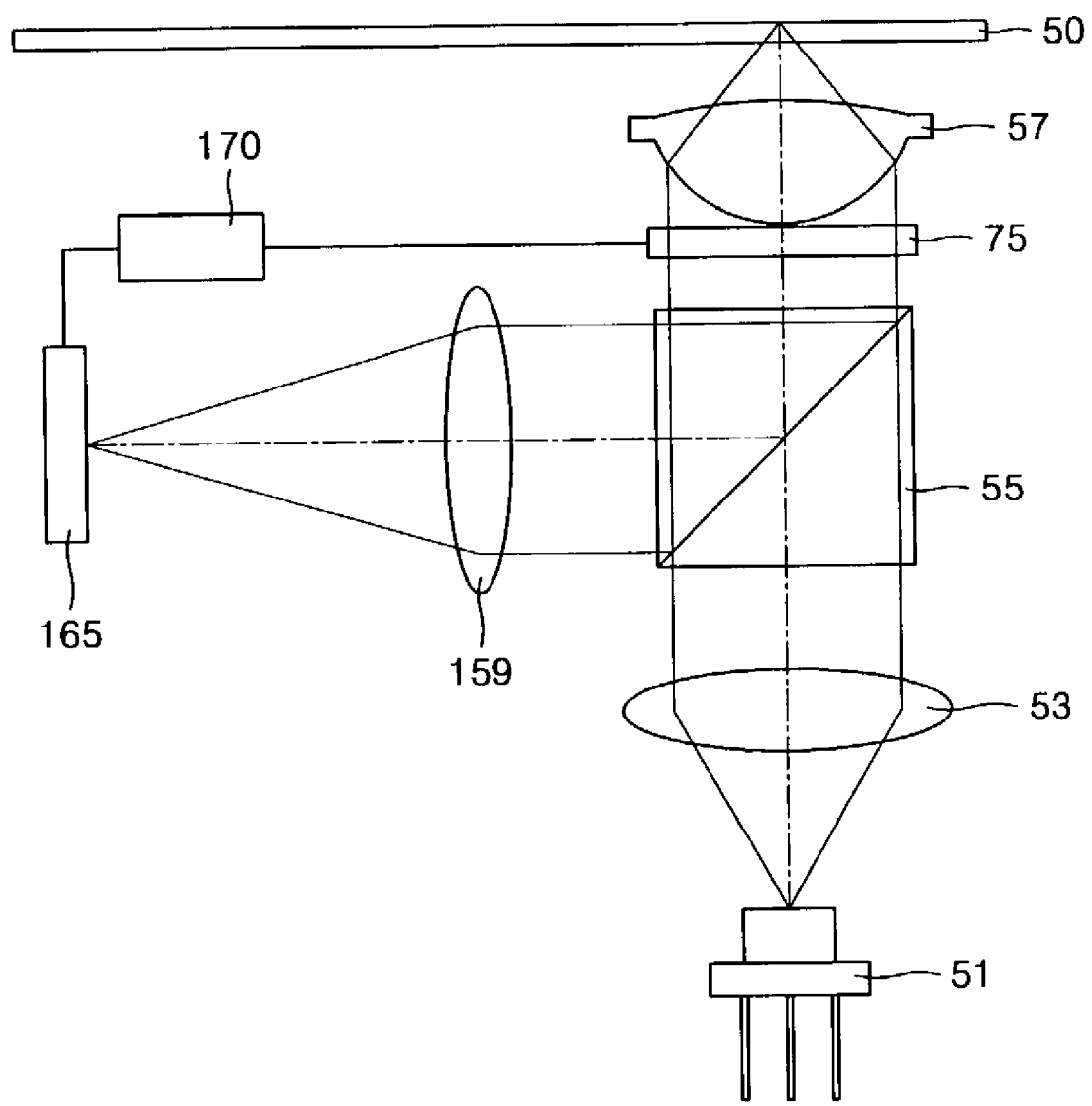
FIG. 14 is a view showing the optical arrangement of an optical pickup apparatus according to another embodiment of the present invention.

FIG. 14 shows an optical arrangement of an optical pickup apparatus according to another embodiment of the present invention. Here, since members having the same reference numerals as those in FIG. 6 have the same functions, detailed descriptions thereof will be omitted.

The optical pickup apparatus has an optical structure capable of detecting the focus error signal using an astigmatism method. That is, the detection unit detects the light beam input after passing through the objective lens 57 by dividing the light beam into first through fourth light areas in the rotation direction. A photodetector 165 including first through fourth light receiving areas 165a, 165b, 165c, and 165d detecting the light beam divided into the first through fourth light areas as shown in FIG. 15, may be provided as the detection unit.

Figure 15:
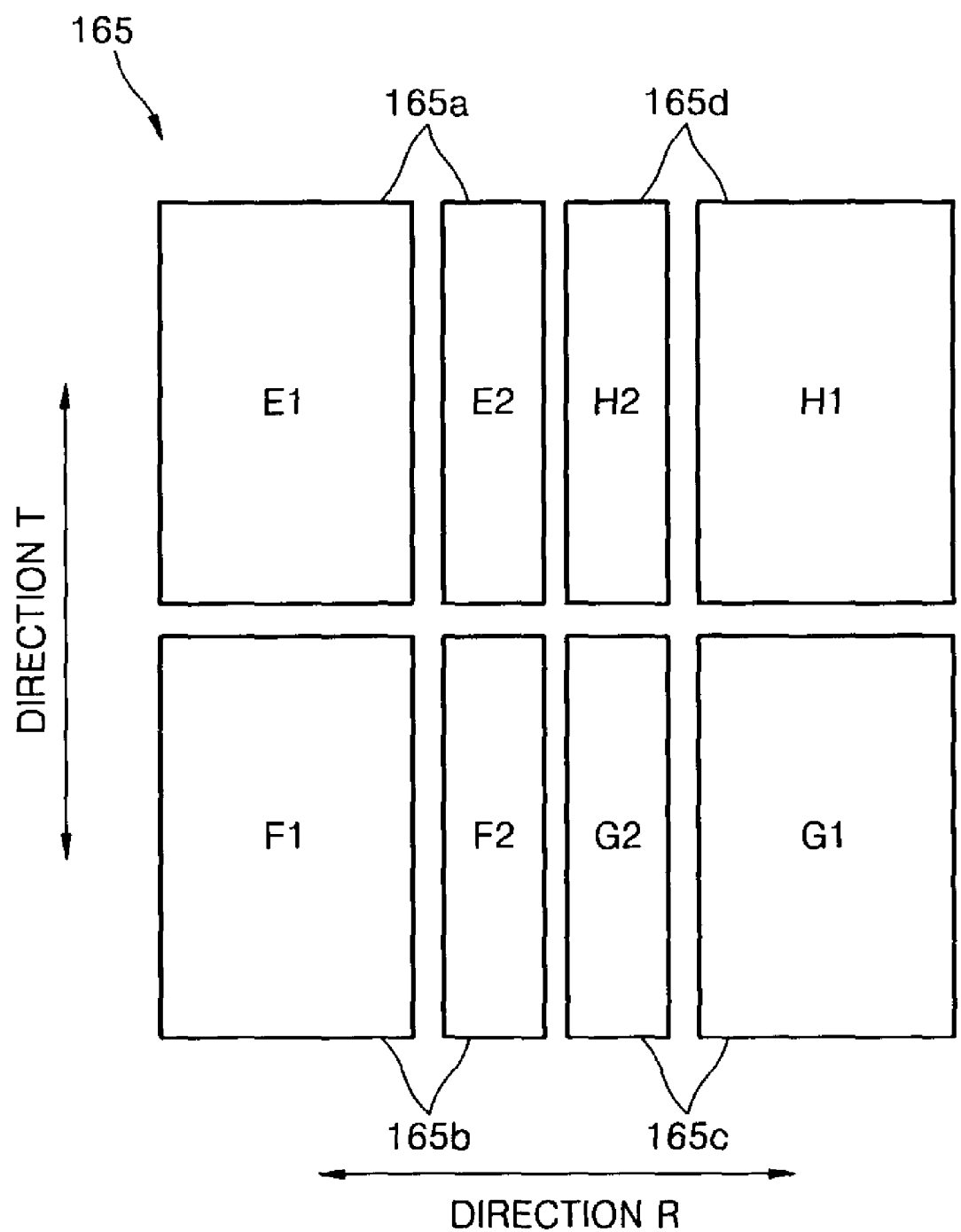
FIG. 15 is a view showing an example of the photodetectors of FIG. 14.

The photodetector 165 as shown in FIG. 15, preferably has an eight-section structure (2×8 matrix structure) in which the first through fourth light receiving areas 165a, 165b, 165c, and 165d are divided in the direction R, so that the RF signal having the reduced cross talk due to the neighboring tracks can be detected. First through fourth inner/outer light receiving areas E1/E2, F1/F2, G1/G2, and H1/H2 of the first through fourth light receiving areas 165a, 165b, 165c, and 165d detect the light beam of the first through fourth areas divided into the first through fourth inner and outer light areas in the direction R, respectively. For the convenience of explanation, in FIG. 15, the first through fourth inner/outer light receiving areas E1/E2, F1/F2, G1/G2, and H1/H2 are indicated by the same reference numerals as those of the inner and outer light receiving areas of the fifth through eighth light receiving areas 165a, 165b, 165c, and 165d.

When the first through fourth inner/outer light receiving areas E1/E2, F1/F2, G1/G2, and H1/H2 of the photodetector 165 and detection signals thereof are indicated by the same reference numerals, an equation for the detection of the RF signal by the optical pickup apparatus is the same as the above Mathematical Formula 4.

Here, the photodetector 165 may be formed of four light receiving areas having a 2×2 matrix structure to divide and detect the light beam input after passing through the objective lens 57 into the first through fourth light areas.

Meanwhile, the optical pickup apparatus preferably includes a cylindrical lens generating astigmatism as a sensing lens 159 installed on the optical path between the optical path changing device and the photodetector 165 of the detection unit focusing an incident light beam to be received by the photodetector 165. Alternatively, a condensing lens may be provided as the sensing lens 59 and a cylindrical lens generating the astigmatism may be further provided.

In the present embodiment, a signal processor 170, as the signal processor 70 of FIG. 6, obtains the focus error signal (FES') in an astigmatism method by using detection signals output from the detection unit and detects a thickness signal of the recording medium 50 by using the obtained FES'. Preferably, the signal processor 170, as the signal processor 70 of FIG. 6, obtains the calculation value of (a−b)/(a+b) and outputs the thickness signal of the recording medium 50 corresponding thereto, when the maximum value and the absolute value of the minimum value of the S-curve of the FES' with respect to the reference level are a and b, respectively.

When the detection unit has the above structure described with reference to FIG. 15, the signal processor 170 preferably detects the first signal FES1' which is the first sum of detection signals of the first inner and outer light areas and the third inner and outer light areas and a second signal FES2' which is the second sum of detection signals of the second inner and outer light areas and the fourth inner and outer light areas, and detects the focus error signal FES' by subtracting FES2' from FES1'.

Here, the first and second signals FES1' and FES2' and the focus error signal FES' are obtained according to Mathematical Formula 6.

$$FES1'=E1+E2+G1+G2,$$

$$FES2'=F1+F2+H1+H2, \text{ and}$$

$$FES'=FES1'-FES2'. \quad \text{Mathematical Formula 6}$$

Figure 16:
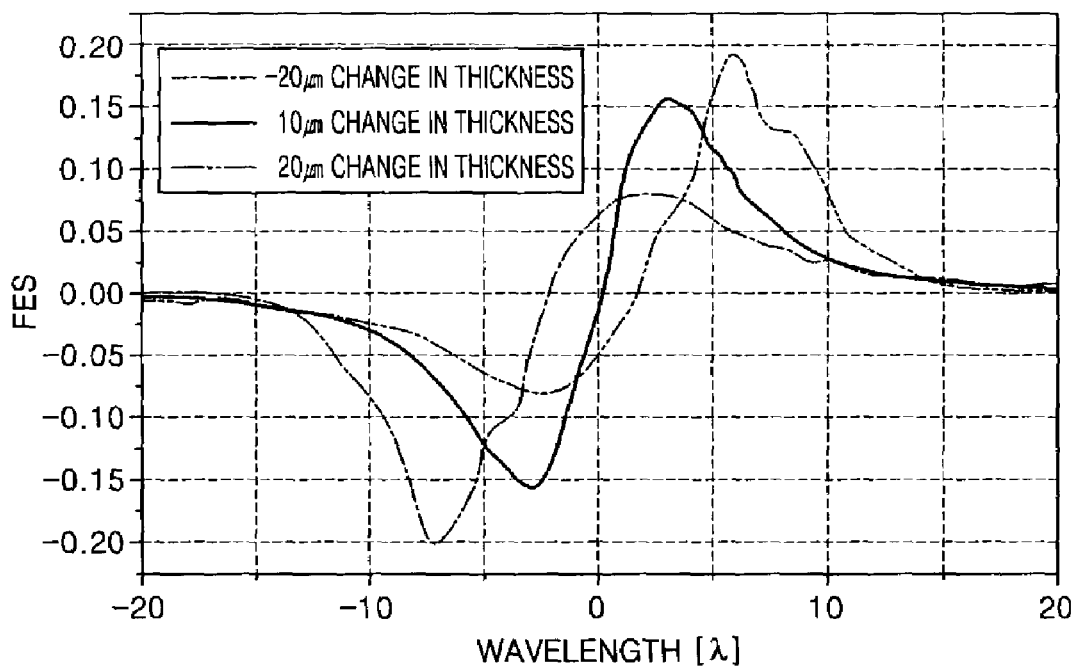
FIG. 16 is a graph showing a change of an S-curve of an FES' obtained in an astigmatism method according to a change in thickness of a recording medium.

FIG. 16 shows the S-curve of the FES' obtained from Mathematical Formula 6. As can be seen from FIG. 16, the S-curve of the FES' obtained in the astigmatism method moves to the left and right according to a change in thickness of the recording medium 50, like the FES obtained in the optical pickup apparatus of FIG. 6. Further, the ratio of magnitude between the maximum point and the minimum point with respect to the reference level (the axis of which value is 0 along the vertical axis in FIG. 16) is changed according to the change in thickness of the recording medium 50.

Figure 17:
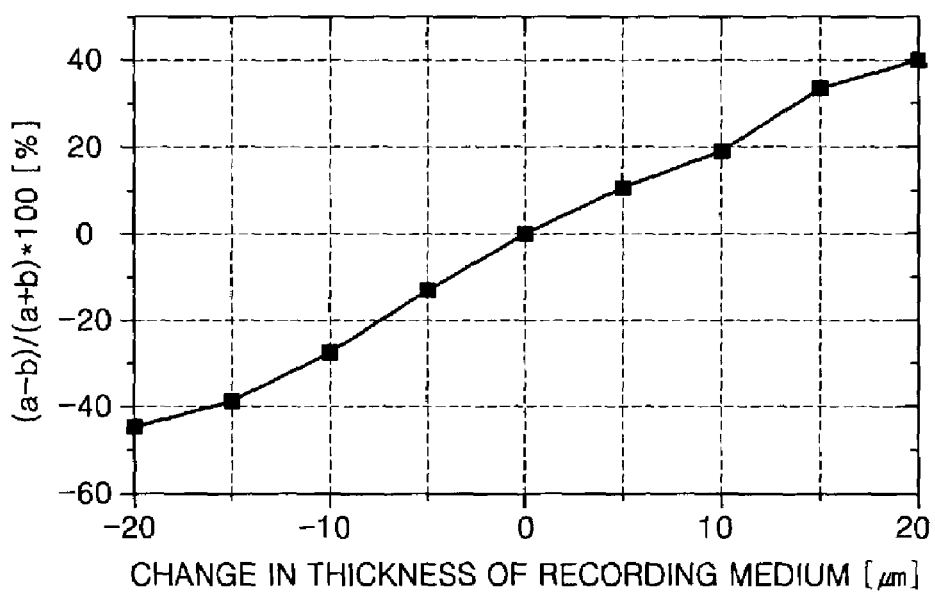
FIG. 17 is a graph showing a percentage of (a−b)/(a+b) calculated with respect to the S-curve of the FES' obtained in the astigmatism method with respect to a change in thickness of a recording medium by using the maximum value a and the absolute value b of the minimum value defined as in FIG. 9.

Thus, as can be seen from FIG. 17, which shows the percentage of (a−b)/(a+b) calculated using the maximum value a and the absolute value b of the minimum value with respect to the predetermined threshold value of the FES', when the FES' is obtained in the astigmatism method, the calculated value of (a−b)/(a+b)×100 changes almost linearly while the thickness of the recording medium 50 changes within a scope of −20~20 μm with respect to a predetermined reference thickness.

Thus, when the FES' detected in the astigmatism method is used, the change in thickness of the recording medium 50 can be quantitatively detected as in the previous embodiment.

Figure 18:
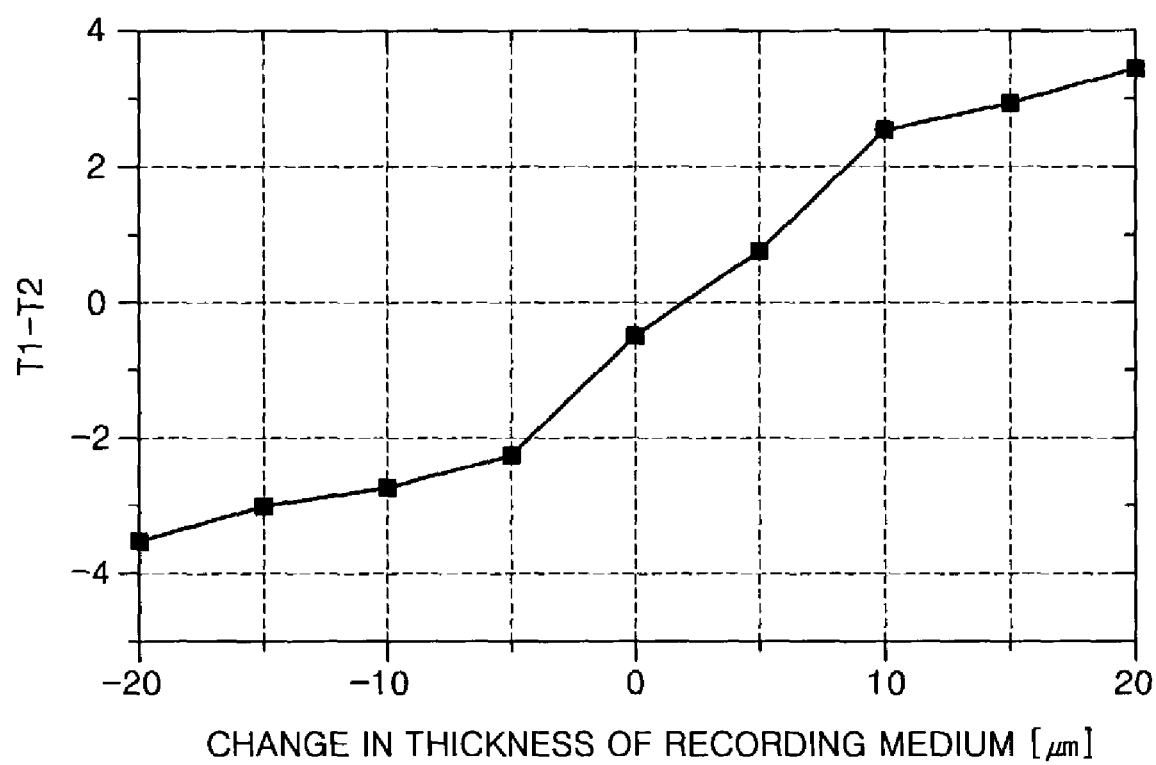
FIG. 18 is a graph showing a difference value (T1−T2) of widths T1 and T2 indicating that the first and second signals are greater than a predetermined threshold with respect to a change in thickness of a recording medium when the FES' obtained in the astigmatism method is obtained by a subtraction between the first and second signals FES1' and FES2' as shown in FIGS. 16 and 17.

Alternatively, when the widths indicating the FES1' and FES2' are greater than the predetermined threshold value are T1 and T2, respectively, as shown in FIG. 12 and obtained from the optical pickup apparatus of FIG. 6, the signal processor 170 may be provided to detect the difference between T1 and T2 (T1−T2) and detects the thickness signal of the recording medium 50 by using the detected difference. Of course, as described above, the result of subtraction between the FES1' and FES2' is the S-curve of the FES'. As to the FES1' and FES2' of which result of subtraction is the S-curve of the FES' by the astigmatism method, when the threshold value is appropriately selected, as shown in FIG. 18, the change of the value (T1−T2) with respect to the change in thickness of the recording medium 50 changes almost linearly with respect to the change in thickness of the recording medium 50. Thus, by utilizing the linearity, the change in thickness of the recording medium 50 can be quantitatively detected as in the case of using the calculation value of (a−b)/(a+b).

The thickness signal of the recording medium 50 output from the signal processor 170 according to the present embodiment can be used to correct the spherical aberration due to the change in thickness of the recording medium by driving the spherical aberration correcting device 75, as shown in FIGS. 6 and 14.

As described above, the optical pickup apparatus according to the present invention can quantitatively detect the change in thickness of the recording medium. Also, the spherical aberration due to the change in thickness of the recording medium can be corrected by driving the spherical aberration correcting device according to the thickness signal corresponding to the change in thickness of the recording medium.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. An optical pickup apparatus comprising:
 a light source generating and emitting a light beam;
 an objective lens condensing the light beam emitted from the light source to form a light spot on a recording medium;
 an optical path changing device changing a proceeding path of the light beam;
 a detection unit detecting the light beam reflected/diffracted by the recording medium and passing through the objective lens and the optical path changing device by dividing the light beam into a plurality of light areas to generate light area detection signals; and
 a signal processor obtaining focus error signal from the light area detection signals output from the detection unit, wherein the focus error signal comprises a first signal, a second signal, and an S curve obtained therefrom, the signal processor generating a maximum value (a) and an absolute value (b) of maximum and minimum points of the S-curve, respectively, with respect to a predetermined reference level, and obtaining a calculation value of (a−b)/(a+b), and outputting a thickness signal of the recording medium based on the obtained calculation value.

2. The optical pickup apparatus as claimed in claim 1, wherein the light areas comprise first through fourth inner light areas in a rotation direction and first through fourth outer light areas disposed outside the first through fourth inner light areas in the rotation direction to form a 4×2 matrix structure when a row and a column of the first through fourth inner and outer light areas correspond to a radial direction and a tangential direction of the recording medium, respectively, the light area detection signals comprise first through fourth inner light area signals and first through fourth outer light area signals, and the signal processor detects a first signal, which is a first sum of the first and third outer light areas and the second and fourth inner light areas, and a second signal, which is a second sum of the second and fourth outer light areas and the first and third inner light areas, and detects the S curve of the focus error signal by subtracting the second signal from the first signal or by subtracting the first signal from the second signal.

3. The optical pickup apparatus as claimed in claim 2, wherein the detection unit comprises:
 a holographic optical element dividing the light beam into first through fourth light areas in a rotation direction of the recording medium and diffracting light beams of the first through fourth light areas to $+1^{st}$ order and/or $-1^{st}$ order; and
 a photodetector having first through fourth light receiving areas receiving respective light beams by dividing each of the first through fourth light areas of the $+1^{st}$ order or $-1^{st}$ order diffracted by the holographic optical element into inner light areas and outer light areas in a direction corresponding to a tangential direction of the recording medium.

4. The optical pickup apparatus as claimed in claim 1, wherein the detection unit comprises:
 a holographic optical element dividing the light beam into first through fourth light areas in a rotation direction of the recording medium and diffracting light beams of the first through fourth light areas to $+1^{st}$ order and/or $-1^{st}$ order; and
 a photodetector having first through fourth light receiving areas receiving respective light beams by dividing each of the first through fourth light areas of the $+1^{st}$ order or $-1^{st}$ order diffracted by the holographic optical element into inner light areas and outer light areas in a direction corresponding to a tangential direction of the recording medium.

5. An optical pickup apparatus including a light source to generate and emit a light beam, an objective lens to condense the light beam to form a light spot on a recording medium, and an optical oath changing device changing a proceeding path of the light beam, the apparatus comprising:
 a detection unit detecting the light beam reflected/diffracted by the recording medium and passing through the objective lens and the optical path changing device by dividing the light beam into a plurality of light areas to generate light area detection signals; and
 a signal processor obtaining a focus error signal from the light area detection signals output from the detection unit and detecting a thickness signal of the recording medium using the obtained focus error signal, wherein the light areas comprise first through fourth inner light areas in a rotation direction and first through fourth outer light areas disposed outside the first through fourth inner light areas in the rotation direction to form a 4×2 matrix structure when a row and a column of the first through fourth inner and outer light areas correspond to a radial direction and a tangential direction of the recording medium, respectively, the light area detection signals comprise first through fourth inner light area signals and first through fourth outer light area signals, and the signal processor detects a first signal, which is a first sum of the first and third outer light areas and the second and fourth inner light areas, and a second signal, which is a second sum of the second and fourth outer light areas and the first and third inner light areas, and detects the focus error signal by subtracting the second signal from the first signal or by subtracting the first signal from the second signal.

6. The optical pickup apparatus as claimed in claim 3, wherein the detection unit comprises:
a holographic optical element dividing the light beam into first through fourth light areas in a rotation direction of the recording medium and diffracting light beams of the first through fourth light areas to $+1^{st}$ order and/or $-1^{st}$ order; and
a photodetector having first through fourth light receiving areas receiving respective light beams by dividing each of the first through fourth light areas of the $+1^{st}$ order or $-1^{st}$ order diffracted by the holographic optical element into inner light areas and outer light areas in a direction corresponding to a tangential direction of the recording medium.

7. An optical pickup apparatus including a light source to generate and emit a light beam, an objective lens to condense the light beam to form a light spot on a recording medium, and an optical path changing device changing a proceeding path of the light beam, the apparatus comprising:
a detection unit detecting the light beam reflected/diffracted by the recording medium and passing through the objective lens and the optical oath changing device by dividing the light beam into a plurality of light areas to generate light area detection signals; and
a signal processor obtaining a focus error signal from the light area detection signals output from the detection unit and detecting a thickness signal of the recording medium using the obtained focus error signal, wherein the detection unit comprises:
a holographic optical element dividing the light beam into first through fourth light areas in a rotation direction of the recording medium and diffracting light beams of the first through fourth light areas to $+1^{st}$ order and/or $-1^{st}$ order; and
a photodetector having first through fourth light receiving areas receiving respective light beams by dividing each of the first through fourth light areas of the $+1^{st}$ order or $-1^{st}$ order diffracted by the holographic optical element into inner light areas and outer light areas in a direction corresponding to a tangential direction of the recording medium.

8. The optical pickup apparatus as claimed in claim 7, wherein the photodetector further comprises fifth through eighth light receiving areas receiving light beams by dividing each of the fifth through eighth light areas of the $+1^{st}$ order or $-1^{st}$ order diffracted by the holographic optical element into inner light areas and outer light areas in a direction corresponding to a radial direction of the recording medium, and when detection signals of the inner light areas of the fifth through eighth light receiving areas are E2, F2, G2, and H2, detection signals of the outer light areas are E1, F1, G1, and H1, and a predetermined gain is k, the signal processor generates an RF signal calculated from the following Mathematical Formula, RF signal=$(E2+F2+G2+H2)+k(E1+F1+G1+H1)$.

9. The optical pickup apparatus as claimed in claim 1, further comprising a spherical aberration correcting device driven according to the thickness signal of the recording medium output from the signal processor to correct spherical aberration occurring due to a change in thickness of the recording medium.

10. The optical pickup apparatus as claimed in claim 1, wherein the signal processor detects the focus error signal by using an astigmatism method.

11. An optical pickup apparatus including a light source to generate and emit a light beam, an objective lens to condense the light beam to form a light spot on a recording medium, and an optical path changing device changing a proceeding path of the light beam, the apparatus comprising:
a detection unit detecting the light beam reflected/diffracted by the recording medium and passing through the objective lens and the optical path changing device by dividing the light beam into a plurality of light areas to generate light area detection signals; and
a signal processor obtaining a focus error signal from the light area detection signals output from the detection unit and detecting a thickness signal of the recording medium using the obtained focus error signal, wherein the signal processor detects the focus error signal by using an astigmatism method, and wherein the detection unit is a photodetector having an eight-section structure detecting the light beam by dividing the light beam into first through fourth light areas in a rotation direction and each of the first through fourth light areas into inner and outer light areas in a direction corresponding to a radial direction of the recording medium.

12. The optical pickup apparatus as claimed in claim 11, wherein, when detection signals of the inner light areas of the first through fourth light areas are E2, F2, G2, and H2, detection signals of the outer light areas of the first through fourth light areas are E1, F1, G1, and H1, and a predetermined gain is k, the signal processor generates an RF signal calculated from the following Mathematical Formula, RF signal=$(E2+F2+G2+H2)+k(E1+F1+G1+H1)$.

13. The optical pickup apparatus as claimed in claim 10, wherein the apparatus comprises:
a spherical aberration correcting device driven according to the thickness signal of the recording medium output from the signal processor to correct a spherical aberration occurring due to a change in thickness of the recording medium.

14. An optical pickup apparatus comprising:
a light source generating and emitting a light beam;
an objective lens condensing the light beam emitted from the light source to form a light spot on a recording medium;
an optical path changing device changing a proceeding path of the light beam; and
a detection unit detecting the light beam reflected/diffracted by the recording medium and passing through the objective lens by dividing the light beam into a plurality of light areas to generate detection signals; and
a signal processor generating a first focus error signal and a second focus error signal using the detection signals of the light areas output from the detection unit, generating a difference between widths of time periods indicating that the first and second focus error signals are greater than a predetermined threshold value, and generating a thickness signal of the recording medium using the detected difference.

15. The optical pickup apparatus as claimed in claim 14, wherein the light areas comprise first through fourth light areas, and the detection unit comprises:
a holographic optical element generating light beams corresponding to first through fourth light areas in a rotation direction and diffracting the light beams of the first through fourth light areas to $+1^{st}$ order and/or $-1^{st}$ order; and
a photodetector having first through fourth light receiving areas receiving respective light beams by dividing each of the first through fourth light areas of the $+1^{st}$ order or $-1^{st}$ order diffracted by the holographic optical element into inner light areas and outer light areas in a direction corresponding to a tangential direction of the recording medium.

16. The optical pickup apparatus as claimed in claim 15, wherein the photodetector further comprises:
fifth through eighth light receiving areas receiving light beams by dividing each of the first through fourth light areas of the $+1^{st}$ order or $-1^{st}$ order diffracted by the holographic optical element into inner light areas and outer light areas in a direction corresponding to a radial direction of the recording medium, and when detection signals of the inner light areas of the fifth through eighth light receiving areas are E2, F2, G2, and H2, detection signals of the outer light areas are E1, F1, G1, and H1, and a predetermined gain is k, the signal processor generates an RF signal from the following Mathematical Formula, $$RF\ signal=(E2+F2+G2+H2)+k(E1+F1+G1+H1).$$

17. The optical pickup apparatus as claimed in claim 14, wherein the detection unit detects the light beam by dividing the light beam into first through fourth inner light areas formed in a rotation direction and first through fourth outer light areas disposed outside the first through fourth inner light areas in the rotation direction of the recording medium to form a 4×2 matrix structure when a row and a column of the light areas correspond to a radial direction and a tangential direction of the recording medium, respectively, and the signal processor generates the first focus error signal from a first sum of the detection signals of the first and third outer light areas and the second and fourth inner light areas and the second focus error signal from a second sum of the detection signals of the second and fourth outer light areas and the first and third inner light areas.

18. The optical pickup apparatus as claimed in claim 17, wherein the detection unit comprises:
a holographic optical element dividing the light beam into the first through fourth inner and outer light areas in a rotation direction and diffracting light beams of the first through fourth light areas to $+1^{st}$ order and/or $-1^{st}$ order; and
a photodetector having first through fourth inner and outer light receiving areas disposed in a direction corresponding to a tangential direction of the recording medium to receive the respective light beams which correspond to the first through fourth inner and outer light areas of the $+1^{st}$ order or $-1^{st}$ order diffracted by the holographic optical element.

19. The optical pickup apparatus as claimed in claim 14, wherein the light areas comprise first, second, third, and fourth light areas in a rotation direction, the detection unit detects light beams corresponding to the first, second, third, and fourth light areas, and the signal processor generates the first focus error signal from a first sum of detection signals of the first and third light areas and the second focus error signal from a second sum of detection signals of the second and fourth light areas.

20. The optical pickup apparatus as claimed in claim 19, wherein the detection unit comprises:
a photodetector having an eight-section structure to detect light beams by dividing each of the first through fourth light areas into inner and outer light areas in a direction corresponding to a radial direction of the recording medium.

21. The optical pickup apparatus as claimed in claim 20, wherein, when detection signals of the inner light areas of the first through fourth light areas are E2, F2, G2, and H2, detection signals of the outer light areas are E1, F1, G1, and H1, and a predetermined gain is k, the signal processor generates an RF signal from the following Mathematical Formula, $$RF\ signal=(E2+F2+G2+H2)+k(E1+F1+G1+H1).$$

22. The optical pickup apparatus as claimed in claim 14, the apparatus comprises:
a spherical aberration correcting device driven according to the thickness signal of the recording medium output from the signal processor to correct a spherical aberration occurring due to a change in thickness of the recording medium.

23. An optical pickup apparatus reproducing data from a recording medium, comprising:
a light source generating and emitting a light beam;
a detection unit detecting the light beam reflected from the recording medium, dividing the light beam into a plurality of light areas, detecting detection signals corresponding to the light areas from the light beam; and
a signal processor obtaining a first focus error signal and a second focus error signal from the light area detection signals and generating a thickness signal of the recording medium from the first focus error signal and the second focus error signal to correct an aberration of the light beam corresponding to a change in thickness of the recording medium, wherein the signal processor generates a first time period when the first focus error signal is greater than a first reference value and a second time period when the second focus error signal is greater than a second reference value and generates the thickness signal from the first time period and the second time period.

24. The optical pickup apparatus as claimed in claim 23, wherein the first reference value is the same as the second reference value.

25. The optical pickup apparatus as claimed in claim 23, wherein the signal processor subtracts the first time period from the second time period to obtain a signal representing the change of the recording medium as the thickness signal.

26. The optical pickup apparatus as claimed in claim 23, wherein the thickness signal changes from a first thickness signal to a second thickness signal based upon change in thickness of the recording medium, and the signal processor generates a thickness change signal from the first thickness signal and the second thickness signal to correct the aberration of the light beam corresponding to the change in thickness of the recording medium.

27. The optical pickup apparatus as claimed in claim 26, wherein the second thickness signal is a reference thickness value.

28. The optical pickup apparatus as claimed in claim 23 and which is compatible with first and second discs of first and second thickness, respectively, wherein the detection unit generates first detection signals and second detection signals from light beams reflected from the first and second discs, respectively, and the signal processor generates a thickness change signal from the first detection signals and the second detection signals as the thickness signal to correct the aberration of the light beams occurring due to a difference between the first thickness of the first disc and the second thickness of the second disc.

29. The optical pickup apparatus as claimed in claim 23, wherein the recording medium comprises a recording layer and an outer layer formed on the recording layer, and the thickness of the recording medium is a distance between an outer surface of the outer layer and a surface of the recording layer.

30. An optical pickup apparatus reproducing data from a recording medium, comprising:
a light source generating and emitting a light beam;
a detection unit detecting the light beam reflected from the recording medium, dividing the light beam into a plurality of light areas, detecting detection signals corresponding to the light areas from the light beam; and
a signal processor obtaining a first focus error signal and a second focus error signal from the light area detection signals and generating a thickness signal of the recording medium from the first focus error signal and the second focus error signal to correct an aberration of the light beam corresponding to a change in thickness of the recording medium, wherein the signal processor generates an S curve from the first and second focus error signals, detects two opposite peak values of the S curve with respect to a reference value, generates a first absolute value and a second absolute value from the tow opposite peak values, and generates the thickness signal from the first absolute value and the second absolute value.

31. The optical pickup apparatus as claimed in claim 30, wherein the signal processor calculates a difference between the first absolute value and the second absolute value to generate the thickness signal.

32. The optical pickup apparatus as claimed in claim 30, wherein the thickness signal comprises a first thickness signal and a second thickness signal, and the signal processor generates a thickness change signal from the first thickness signal and the second thickness signal to correct an aberration of the light beam corresponding to a change in thickness of the recording medium.

33. An optical pickup apparatus reproducing data from a recording medium, comprising:
a light source generating and emitting a light beam;
a detection unit detecting the light beam reflected from the recording medium, dividing the light beam into a plurality of light areas, detecting detection signals corresponding to the light areas from the light beam; and
a signal processor obtaining a first focus error signal and a second focus error signal from the light area detection signals and generating a thickness signal of the recording medium from the first focus error signal and the second focus error signal to correct an aberration of the light beam corresponding to a change in thickness of the recording medium, wherein the detection unit comprises:
a holographic optical element having first through fourth light areas each having an inner light area and an outer light area as the light areas to generate first order beams or second order beams corresponding to the first through fourth light areas, and
a photodetector having first through fourth light receiving areas receiving light beams corresponding to the first through fourth light areas.

34. The optical pickup apparatus as claimed in claim 33, wherein the apparatus comprises:
an objective lens forming a light spot of the light beam emitted from the light source and transmitting the light beam reflected from the recording medium; and
an optical path changing device disposed between the light source and the objective lens to transmit the light beam emitted from the light source and to reflect the light beam reflected from the recording medium or to reflect the light beam reflected from the recording medium and transmit the light beam reflected from the recording medium, wherein the holographic optical element disposed between the optical path changing device and the objective lens.

35. The optical pickup apparatus as claimed in claim 33, wherein the holographic optical element generates a first order beams or a second order beams corresponding to the first through fourth light areas, and the photodetector comprises:
fifth through eighth light receiving areas receiving one of the first order beams and the a second order beams while the first through fourth light areas receives the other one of the first order beams and the second order beams.

36. A method in an optical pickup apparatus reproducing data from a recording medium, comprising:
generating and emitting a light beam;
detecting the light beam reflected from the recording medium, dividing the light beam into a plurality of light areas, detecting detection signals corresponding to the light areas from the light beam;
obtaining a first focus error signal and a second focus error signal from the light area detection signals;
generating a thickness signal of the recording medium from the first focus error signal and the second focus error signal; and
correcting an aberration of the light beam occurring due to a change in thickness of the recording medium in response to the thickness signal, wherein the generating of the thickness signal comprises:
generating a first time period when the first focus error signal is greater than a first reference value and a second time period when the second focus error signal is greater than a second reference value, and
generating a difference between the first and second time periods as the thickness signal.

37. A method in an optical pickup apparatus reproducing data from a recording medium, comprising:
generating and emitting a light beam:
detecting the light beam reflected from the recording medium, dividing the light beam into a plurality of light areas, detecting detection signals corresponding to the light areas from the light beam;
obtaining a first focus error signal and a second focus error signal from the light area detection signals;
generating a thickness signal of the recording medium from the first focus error signal and the second focus error signal; and
correcting an aberration of the light beam occurring due to a chance in thickness of the recording medium in response to the thickness signal, wherein the generating of the thickness signal comprises:

generating a first absolute value of a first peak of the first focus error signal when the first focus error signal is greater than a first reference value and a second absolute value of a second peak of the second focus error signal when the second focus error signal is greater than a second reference value, and generating a calculation value from both a difference and a sum of the first and second absolute values as the thickness signal.

38. A thickness detection unit for use in an apparatus, having a beam emitter to emit a beam, an objective lens to form a beam spot on a medium, and an optical path changing device changing a proceeding path of the beam, the unit comprising:

a detection unit to divide the reflected/diffracted beam into a plurality of areas so as to generate area detection signals; and a signal processor to obtain an S-curve from a focus error signal using the area detection signals so as to generate a calculation value of $(a-b)/(a+b)$, where (a) is a maximum value of a maximum point of the S-curve and (b) is an absolute value of a minimum point of the S-curve, and to detect a thickness signal of the medium that is in accordance with the calculation value.

39. A thickness detection unit for us in an apparatus, including a beam emitter to emit a beam, an objective lens to form a beam spot on a medium, and an optical path changing device changing a proceeding path of the beam, the unit comprising:

a detection unit to divide the reflected/diffracted beam into a plurality of areas to generate detection signals; and a signal processor to generate an S-curve from a first focus error signal and a second focus error signal using the detection signals of the areas output from the detection unit and to generate a calculation value equal to the difference of a maximum value of the S-curve and an absolute value of the minimum value of the S-curve divided by the sum of the maximum value of the S-curve and the absolute value of the minimum value of the S-curve so as to detect a thickness signal of the medium using the detected difference.

40. A thickness detection unit for use in an apparatus to record/reproduce data from a medium, the unit comprising:

a beam source to emit a beam:

a detection unit to detect the beam reflected from the recording medium, to divide the beam into a plurality of areas, and to detect detection signals corresponding to the areas from the beam; and a signal processor to obtain an S-curve from a first focus error signal and a second focus error signal from the light area detection signals, to generate a calculation value equal to the difference of a maximum value of the S-curve and an absolute value of the minimum value of the S-curve divided by the sum of the maximum value of the S-curve and the absolute value of the minimum value of the S-curve so as to detect a thickness signal of the medium, and to correct an aberration of the beam corresponding to a change in thickness of the medium.

41. A method of reproducing data from a medium in an apparatus in which a beam is emitted, the method comprising:

detecting the beam, dividing the beam into a plurality of areas, and detecting detection signals corresponding to light areas;

obtaining a first focus error signal and a second focus error signal from the area detection signals;

generating a first absolute value of a first peak of the first focus error signal when the first focus error signal is greater than a first reference value and a second absolute value of a second peak of the second focus error signal when the second focus error signal is greater than a second reference value; and generating a thickness signal from both a difference and a sum of the first and second absolute values; and correcting an aberration of the beam occurring due to a change in thickness of the medium in response to the thickness signal.

42. An optical pickup apparatus including a light source to emit a beam, an objective lens to cause the beam to form a light spot on a recording medium, and an optical path changing device to change a path of the beam, the apparatus comprising;

a detector to detect the beam reflected/diffracted by the recording medium and passing through the objective lens and the optical path changing device by dividing the beam into a plurality of areas to generate area detection signals; and a signal processor to obtain a focus error signal comprising a first signal, a second signal, and an S curve obtained therefrom from the area detection signals, the signal processor generating a maximum value (a) and an absolute value (b) of maximum and minimum points of the S-curve, respectively, with respect to a predetermined reference level, calculating $(a-b)/(a+b)$, and outputting a thickness signal of the recording medium based on the calculation.

43. An optical pickup apparatus reproducing data from a recording medium including a light source to emit a beam, the apparatus comprising a detection unit to detect the beam reflected from the recording medium, to divide the beam into a plurality of areas, and to detect detection signals corresponding to the areas from the beam; and a signal processor to obtain a first focus error signal and a second focus error signal from the light area detection signals so as to generate a thickness signal of the recording medium to correct an aberration of the light beam corresponding to a change in thickness of the recording medium, wherein the signal processor generates a first time period when the first focus error signal is greater than a first reference value and a second time period when the second focus error signal is greater than a second reference value and generates the thickness signal from the first time period and the second time period.

44. A method of operating an optical pickup apparatus reproducing data from a recording medium in which a beam is emitted and detected, the method comprising:

dividing the beam into a plurality of areas and detecting detection signals corresponding to the areas;

obtaining a first focus error signal and a second focus error signal from the area detection signals;

generating a thickness signal of the recording medium by generating a first time period when the first focus error signal is greater than a first reference value and a second time period when the second focus error signal is greater than a second reference value and then generating a difference between the first and second time periods as the thickness signal; and correcting an aberration of the light beam occurring due to a change in thickness of the recording medium in response to the thickness signal, wherein the generating of the thickness signal comprises.

* * * * *

UNITED STATES PATENT AND TRADEMARK OFFICE
CERTIFICATE OF CORRECTION

| | |
|---|---|
| PATENT NO. | : 7,020,055 B2 |
| APPLICATION NO. | : 10/233569 |
| DATED | : March 28, 2006 |
| INVENTOR(S) | : Jong-bae Kim et al. |

It is certified that error appears in the above-identified patent and that said Letters Patent is hereby corrected as shown below:

Column 14, line 53, change "oath" to --path--.

Column 15, line 36, change "oath" to --path--.

Column 19, line 40, change "tow" to --two--.

Column 21, line 25, change "us" to --use--.

Signed and Sealed this

Fourteenth Day of November, 2006

JON W. DUDAS
*Director of the United States Patent and Trademark Office*